(No Model.)

J. O. STOCKWELL.
PREVENTION OF INDUCTION IN ELECTRIC CIRCUITS.

No. 355,420. Patented Jan. 4, 1887.

ATTEST:
J. A. Hurdle
Edward P. Thompson

INVENTOR:
John O. Stockwell
By W. J. Johnston
Attorney

UNITED STATES PATENT OFFICE.

JOHN OSCAR STOCKWELL, OF BURLINGTON, KANSAS.

PREVENTION OF INDUCTION IN ELECTRIC CIRCUITS.

SPECIFICATION forming part of Letters Patent No. 355,420, dated January 4, 1887.

Application filed March 18, 1886. Serial No. 195,647. (No model.)

*To all whom it may concern:*

Be it known that I, JOHN OSCAR STOCKWELL, a citizen of the United States, and a resident of Burlington, in the county of Coffey and State of Kansas, have invented certain new and useful Improvements in Prevention of Induction in Electric Circuits, of which the following is an exact description.

My invention relates to systems for overcoming the ill effects of induced currents generated by adjacent electric light and power currents; and its object is to establish a system of this class that the ill effects may be reduced to such an extent that telephonic conversation may not be interfered with at all.

The invention comprises telephones, main lines, inductorii, and details of disposition adapted to be uninfluenced by foreign sources as far as the telephonic vibrations at the telephones are concerned.

Figure 1:
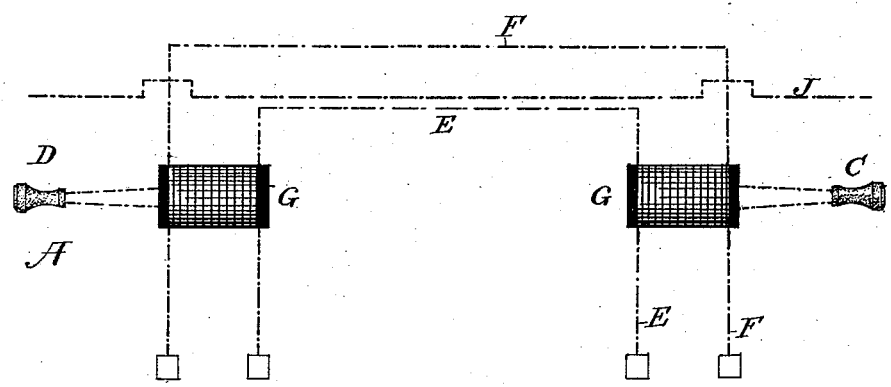
Figure 2:
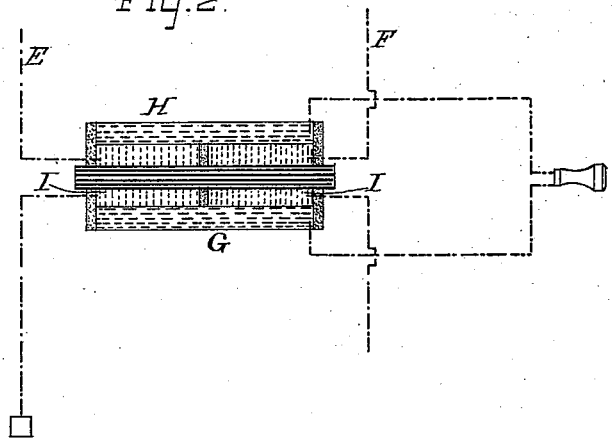

Figure 1 is a general outside view of the disposition of the elements composing the system, while Fig. 2 is a cross-sectional view of an inductorium and of the electrical connections to the same.

The electrical connections are not clearly shown in Fig. 1, while they are in Fig. 2. Referring to the figures, it is noticed that the elements comprising my invention are two stations, A and B, two telephones, C and D, one at each station, two main lines, E and F, two inductoriums, G, with three coils to each inductorium, the outer or primary coil, H, being in circuit with the telephone, and the inner or secondary coils, I, being separately in circuit with the main lines and wound in opposite directions. Each main line has an earth-connection at each station, as shown by the squares in the lower part of Fig. 1.

When telephonic communication is carried on between the two telephones any current induced from a foreign source (such as a circuit represented in part by J) in one main line will be induced in the other main line also, and the combined result of these two induced currents upon the local circuits including the telephones will be zero, because the two coils I are wound in opposite directions.

The invention is not limited to the precise construction hereinbefore described, as it is evident that many modifications may be made therein without departing from the spirit of the invention.

Having described my invention, what I claim is—

1. In a system for the prevention of induction in telephone-lines, the combination at each station of an inductorium having one primary coil and two secondary coils, each primary being local and including a telephone, and each secondary constituting a main line, and having an earth-connection at each station, substantially as and for the purpose described.

2. In a system for the prevention of induction in telephone-lines, the combination of two stations, two telephones, one at each station, two main lines, and an inductorium at each station, each having three coils, the outer or primary coil including a telephone, and the inner or two secondary coils being separately in circuit with the main lines and with the earth and wound in opposite directions, as and for the purpose described.

In testimony whereof I hereunto sign my name, in the presence of two subscribing witnesses, this 30th day of January, 1886.

JOHN OSCAR STOCKWELL.

Witnesses:
GEO. D. CARPENTER,
HARRY E. KELLEY.